Figures 1, 2:
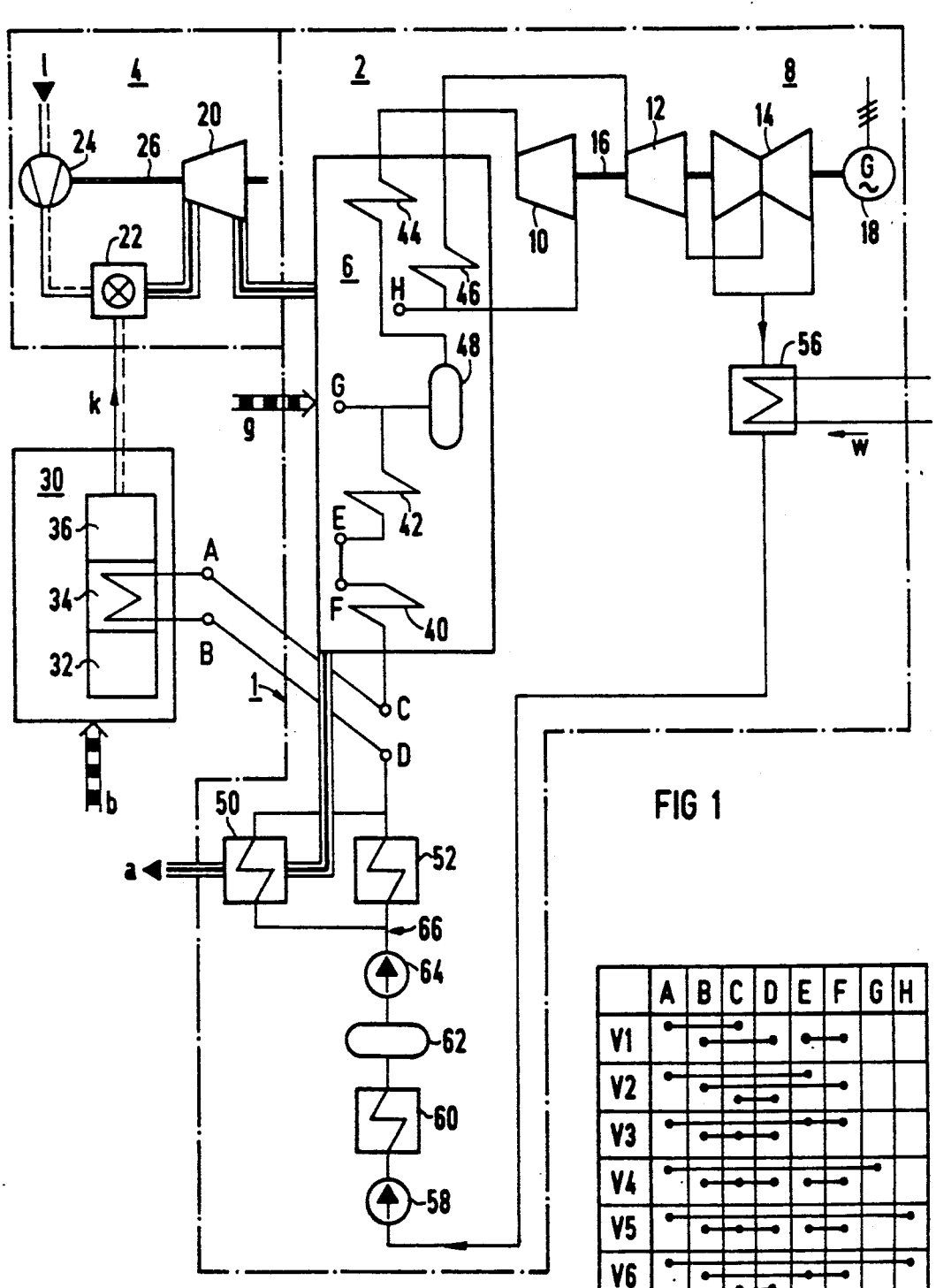

United States Patent [19]

Brückner et al.

[11] Patent Number: 5,079,909
[45] Date of Patent: Jan. 14, 1992

[54] COMBINED GAS AND STEAM TURBINE PLANT WITH COAL GASIFICATION

[75] Inventors: Hermann Brückner, Uttenreuth; Lothar Stadie, Höchstadt/Aisch, both of Fed. Rep. of Germany

[73] Assignee: Siemens Aktiengesellschaft, Munich, Fed. Rep. of Germany

[21] Appl. No.: 542,428

[22] Filed: Jun. 22, 1990

[30] Foreign Application Priority Data

Jun. 27, 1989 [DE] Fed. Rep. of Germany ....... 3921439

[51] Int. Cl.$^5$ ............................. F02C 3/28; F02C 6/18
[52] U.S. Cl. .................................. 60/39.12; 60/39.182
[58] Field of Search ............... 60/39.12, 39.182, 39.02, 60/39.07

[56] References Cited

U.S. PATENT DOCUMENTS

| | | | |
|---|---|---|---|
| 4,099,374 | 7/1978 | Foster-Pegg | 60/39.12 |
| 4,261,166 | 4/1981 | Mayhofer | 60/39.12 |
| 4,288,979 | 9/1981 | Liljedahl et al. | 60/39.12 |
| 4,546,603 | 10/1985 | Anakawa et al. | 60/39.12 |
| 4,723,407 | 2/1988 | Goebel et al. | 60/39.12 |

OTHER PUBLICATIONS

R. Müller and U. Schiffers "Kohledruckvergasung für den Kombiprozess" (Coal Gasification Under Pressure for the Combined Cycle Process); VGB-Kraftwerkstechnik 68 (1988); pp. 1022–1030.

R. Müller and J. Karg "Assessment of Coal Gasification for Combined Cycle Power Plants"; Siemens-Publication No. A19100–U936–A103–X–7600.

*Primary Examiner*—Louis J. Casaregola
*Attorney, Agent, or Firm*—Herbert L. Lerner; Laurence A. Greenberg

[57] ABSTRACT

A combined gas and steam turbine plant includes a coal gasification system having a heat exchanger device and preferably a gas scrubber connected downstream of the heat exchanger device. A gas turbine part is connected downstream of the coal gasification system and has an exhaust gas turbine. A steam generator system receives exhaust gas from the exhaust gas turbine and has an economizer heating surface, an evaporator heating surface, and superheater heating surfaces. A steam turbine part is connected to the steam generator system and has a high-pressure feedwater system. The heat exchanger device of the coal gasification system is connected in such a way that it directly transfers or gives up thermal energy for feedwater heating or steam generation to the high-pressure feedwater system of the steam turbine part.

4 Claims, 1 Drawing Sheet

COMBINED GAS AND STEAM TURBINE PLANT WITH COAL GASIFICATION

The invention relates to a combined gas and steam turbine plant having a coal gasification system being connected upstream of a gas turbine part and having a heat exchanger device and preferably a gas scrubber connected downstream of the heat exchanger device, a steam generator system through which the exhaust gas of an exhaust gas turbine flows having an economizer heating surface, an evaporator heating surface, and superheater heating surfaces, and a steam turbine part being connected to the steam generator system and having a high-pressure feedwater system.

In combined gas and steam turbine plants of the type defined above, after scrubbing the coal gases which are produced by the coal gasification system, they serve as fuel for driving the gas turbine, as disclosed by R. Müller and U. Schiffers in "Kohledruckvergasung füur den Kombi-Prozeß" [Coal Gasification Under Pressure for the Combined Cycle Process], VGB Kraftwerkstechnik 68 (1988), pp. 1022-1030. The hot exhaust gases from the gas turbine which contain oxygen, are delivered to a waste heat steam generator in order to produce high-pressure and low-pressure steam.

For gas scrubbing in the coal gasification system and for further utilization of the thermal energy of the coal gas, it is appropriate to cool down the hot coal gases, which are far above 1000° C. in the coal gasification process itself. In a known power plant disclosed in Siemens Publication No. A19100-U936-A103-X-7600 by Rainer Müller and Jürgen Karg entitled "Assessment of Coal Gasification Systems for Combined Cycle Power Plants", particularly FIG. 9, the thermal energy bound in the coal gas, or "sensible heat", is utilized in so-called crude gas steam generators, waste heat steam generators or heat exchangers for producing steam at high temperature. The steam is fed into the steam turbine and thus contributes to improving the process efficiency of the power plant. However, because of the relatively high temperature, corrosion damage occurs at the heating surface tubes (piping system) located in the crude gas steam generators, waste heat steam generators or heat exchangers.

It is accordingly an object of the invention to provide a combined gas and steam turbine plant with coal gasification, which overcomes the hereinafore-mentioned disadvantages of the heretofore-known devices of this general type and to further improve the efficiency of a combined plant of the type initially described above, while simultaneously making use of heat transfer at relatively low temperature and correspondingly suppressing the corrosion damage to the piping system.

With the foregoing and other objects in view there is provided, in accordance with the invention, a combined gas and steam turbine plant, comprising a coal gasification system having a heat exchanger device and preferably a gas scrubber connected downstream of the heat exchanger device; a gas turbine part being connected downstream of the coal gasification system and having an exhaust gas turbine; a steam generator system receiving exhaust gas from the exhaust gas turbine and having an economizer heating surface, an evaporator heating surface, and superheater heating surfaces; a steam turbine part being connected to the steam generator system and having a high-pressure feedwater system; and means for connecting the heat exchanger device of the coal gasification system to the high-pressure feedwater system of the steam turbine part for directly transferring or giving up thermal energy for feedwater heating or steam generation.

In other words, the secondary side of the heat exchanger device is incorporated in some way into the high-pressure feedwater system, and as a result the high-pressure feedwater and/or the steam formed from it flows through it. This flow may be the full flow or only a partial flow of the high-pressure feedwater. Care need only be taken to ensure that the steam being formed is not be superheated to high temperatures, in order to suppress the corrosion vulnerability.

Due to the direct transfer of the thermal energy of the heat exchanger device to the high-pressure feedwater system, which receives the "sensible heat" from the coal gasification system, the coal gasification system can be operated at relatively high pressure, which results in high efficiency in connection with the steam generator connected downstream and the turbine system.

Advantageous embodiments of the invention for feeding the thermal energy of the heat exchanger device into the high-pressure feedwater system are provided as needed or required in accordance with the ensuing description. In principle, the coal gases emerging from the coal gasification system at a temperature of far above 1000° C. can be cooled down at any point in the feedwater system by means of the heat exchanger device. It is important for thermodynamic reasons in each case that the "sensible heat" of the combustible coal gas produced in the coal gasification system is not given up to the environment as lost heat but rather is utilized in the power plant process at a high pressure level.

In accordance with another feature of the invention, the connecting means connects the heat exchanger device upstream of the economizer heating surface of the steam generator system. An opportunity for dissipating the "sensible heat " through the heat exchanger device at very favorable cost is provided in this way, which will be referred to as variant 1 .

In accordance with a further feature of the invention, the connecting means connects the heat exchanger device between the economizer heating surface and the evaporator heating surface. As compared to the connection described above, this connection, which will be referred to below as variant 2, provides an improvement in partial load operation.

In accordance with an added feature of the invention, the connecting means connects the heat exchanger device parallel to the economizer heating surface. This connection, which will be referred to below as variant 3, provides a further improvement of the partial load conditions.

In accordance with an additional feature of the invention, the connecting means connects the heat exchanger device parallel to the steam generator system. This connection, which will be referred to below as variant 4, also provides a further improvement of the partial load conditions and is a thermodynamically improved version, with good partial-load performance.

In accordance with yet another feature of the invention, the superheater heating surfaces of the steam generator system include an intermediate superheater heating surface having an inlet, and the connecting means connects the heat exchanger device to the inlet of the intermediate superheater heating surface. This connection is found in variants 5 and 6, as they will be described below.

In accordance with yet a further feature of the invention, the steam generator system includes a high-pressure portion, and the connecting means connects the heat exchanger device parallel to the entire high-pressure portion. This connection will be referred to as variant 5 below.

In accordance with yet an added feature of the invention, the steam generator system includes a high-pressure portion having the economizer heating surface and a remaining part, and the connecting means connects the heat exchanger device parallel to the remaining part. This connection will be referred to as variant 6 below.

Accordingly, in variants 4, 5 and 6, the hot coal gases can be first cooled down by generating steam, which absorbs the "sensible heat". Further cooling of the gases can then take place in the region of colder steam or water in the feedwater system.

In accordance with a concomitant feature of the invention, there are provided means for eliminating or reducing superheating of steam for steam production from high-pressure feedwater.

Other features which are considered as characteristic for the invention are set forth in the appended claims.

Although the invention is illustrated and described herein as embodied in a combined gas and steam turbine plant with coal gasification, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a schematic and block circuit diagram of a combined gas and steam turbine plant with coal gasification, which includes only those parts that are essential to comprehension of the invention; and FIG. 2 is a table with six variants V1-V6, showing how the energy transfer of the heat exchanger device to the high-pressure feedwater system of the steam turbine part can be effected in conjunction with circuit connection points A-H of FIG. 1.

Referring now to the figures of the drawing in detail and first, particularly, to FIG. 1 thereof, there is seen a combined gas turbine and steam turbine power plant 1 having a steam turbine part 2 and a gas turbine part 4. The steam turbine part 2 has a steam generator system 6 and a steam turbine 8 with a high-pressure stage 10, a medium-pressure stage 12, and a low-pressure stage 14. A generator 18 is mounted on a common shaft 16. An outlet connection point of the high-pressure stage 10 is indicated with reference symbol H.

The steam generator system 6 is preceded by the gas turbine part 4. The gas turbine part 4 includes a gas turbine 20 as well as a combustion chamber 22, to which air 1 is supplied through a compressor 24. The compressor 24 is mounted on a shaft 26 of the gas turbine 20. Coal gas k produced by means of a coal gasifier 32 of a coal gasification system 30, serves as fuel for the combustion chamber 22 of the gas turbine part 4. The fuel which is supplied, i.e. coal, is symbolized by reference symbol b. The coal gas is carried through a heat exchanger (or heat exchanger device) 34 disposed downstream. Connection points of a secondary circuit of the heat exchanger 34 are indicated with reference symbols A and B. The coal gas k is then carried through a gas scrubber 36, so that it is then available in the form of scrubbed coal gas k. The delivery of the fuel b for the coal gasification system 30 as well as the delivery of fuel g for the steam generator system 6, are indicated by an arrow symbols. Coal, oil, coal gas or natural gas may be used as the fuel g in a known manner.

Exhaust gases which are diverted from the gas turbine 20 in the gas turbine part 4, are likewise delivered to the steam generator system 6. These hot exhaust gases which contain oxygen, serve as combustion air for the fuel g used in the steam generator system 6. In the steam generator system 6, the exhaust gases heat an economizer heating surface 40 having connection points C, F, an evaporator heating surface 42 having connection points E, G, and two or more superheater heating surfaces 44 and 46. The superheater surface 46 conventionally belongs to an intermediate or medium-pressure superheater, and the superheater surface 44 belongs to a high-pressure end or final superheater. The steam generator system 6 also has a pressurized water container 48, with an inlet at a connection point G being connected to the outlet of the evaporator heating surface 42. After passing through the steam generator system 6, the exhaust gases are vented in the form of cooled exhaust gases a, such as through a non-illustrated chimney or stack, through the use of a flue gas heat exchanger 50 which is connected downstream.

The steam generator system 6 is preceded by a high-pressure preheater 52 having an outlet connection point D. The preheater 52 is connected parallel to the flue gas heat exchanger 50.

FIG. 1 also shows that cooled water vapor carried out of the low-pressure stage 14 is fed through a condenser 56. In this case it is converted into condensate by supplying cooling water w. The condensate is pumped by a first pump 58 through one or more low-pressure preheaters 60 into a feedwater container 62. A second pump 64 pumps the condensate, which is then referred to as feedwater, into the high-pressure feedwater system that is generally identified by reference numeral 66. In this case, the feedwater is first pumped in parallel through the high-pressure preheater 52 and the flue gas heat exchanger 50. In this process it is preheated by the thermal energy of the flue gas heat exchanger 50. The high-pressure feedwater can then take various routes according to the present invention from the outlet connection point D of the parallel circuit 50, 52. A total of six variants V1-V6 are shown in the table in FIG. 2.

In the first connection variant V1, the connection points A and C; B and D; and E and F are each connected to one another in pairs. In other words, the heat exchanger device 34 is located upstream of the economizer surface 40 of the steam generator system 6. In this way, the heat exchanger 34 is directly incorporated on the second side into the high-pressure feedwater loop of the steam turbine part 2. As a result, the high-pressure feedwater, which was already preheated by bleed steam in the components 60 and 52 and by boiler exhaust gases in the flue gas heat exchanger 50, is additionally heated directly by thermal energy given up by the heat exchanger 34. The feedwater passes through the economizer surface 40 which is connected downstream, it is converted into steam by means of the evaporator surface 42 that is connected downstream and it is supplied through the pressurized water container 48 to the high-pressure end or final superheater surface 44. The superheated steam passes from there into the high-pressure part 10 of the steam turbine 8. The steam route then passes from the outlet of the high-pressure part 10 through the intermediate or medium-pressure superheater surface 46 to the inlet of the medium-pressure stage 12. After passing through the medium-pressure stage 12, the steam reaches the low-pressure stage 14, and from there finally reaches the condenser 56. Once the generator 18 is in operation, the thermal energy is finally converted into electrical energy. It should be noted in this connection that instead of a multi-stage steam turbine 8, two non-illustrated steam turbines can also operate on the same shaft 16.

In the exemplary embodiment of FIG. 1, a different thermal circuit diagram is shown for a steam power plant only having single intermediate superheating in the superheater surface 46. In this case the high-pressure stage 10 is followed by only one medium-pressure stage 12, which in turn is followed by only one low-pressure stage 14. With this often-employed connection, a high degree of energy conversion is attained, as is well known. Other thermal circuits can also be used, such as those with dual intermediate superheating.

After leaving the low-pressure stage 14, the cooled steam reaches the condenser 56. From there it is then supplied in the form of condensate, in the above-described manner, to the feedwater system 66 of the steam generator system 6 by means of the pumps 58, 64.

The connection variants V2–V6 in the table of FIG. 2 provide other options for thermal energy transfer from the heat exchanger 34 of the coal gasification system 30 to the high-pressure feedwater system 66 of the steam generator system 6.

In variant V2, the connection points A and E; B and F; and C and D are each connected to one another in pairs. As a result, the heat exchanger device 34 is connected between the economizer surface 40 and the evaporator surface 42. Once again, the secondary side of the heat exchanger 34 has high-pressure feedwater of the feedwater system 66 flowing directly through it.

In variant V3, the three connections points A, E and F are joined together on one hand, and the three connection points B, C and D are also joined together on the other hand. As a result, there is a parallel circuit of the economizer surface 40 and the evaporator surface 42. In this case, only a partial flow of feedwater flows through the heat exchanger 34.

In variant V4, the connection points A and G, the connection points B, C and D, and the connection points E and F are each connected to one another. As a result, the heat exchanger device 34 is overall connected in parallel to the steam generator system 6. In this case, steam that is only slightly superheated, or not superheated at all, is produced from the high-pressure feedwater. This precautionary step is attained by means of constructions that are already known (such as forced circulation systems).

In variant V5, the outlet connection point A of the heat exchanger device 34 is connected to the connection point H at the inlet to the intermediate or medium-pressure superheater surface 46. In contrast, the inlet connection point B of the heat exchanger device 34 is connected to the outlet connection point D of the parallel circuit 50, 52 and to the inlet connection point C of the economizer surface 40. The points E and F between the two heating surfaces 40, 42 are connected to one another. As a result, the heat exchanger device 34 is in connected parallel to the high-pressure part of the entire steam generator system 6. The feedwater pressure is reduced to the pressure level of the medium-pressure system prior to entering the connection point B, by means of a non-illustrated reducing valve. Accordingly, the heat exchanger device 34 is acted upon by high pressure once again. However, only a partial flow of high-pressure feedwater flows therethrough, in order to generate steam therein having the parameters at the outlet of the high-pressure part 10.

Finally, in variant V6, the connection points A, H; B, F; C, D; and E, F are connected to one another. As a result, the heat exchanger device 34 is connected in parallel to the high-pressure part, without an economizer heating surface 40, of the steam generator system 6. Once again, the thermal energy of the heat exchanger device 34 is transferred directly into the high-pressure feedwater loop.

We claim:

1. Combined gas and steam turbine plant, comprising a coal gasification system having a heat exchanger device with an inlet and an outlet; a gas turbine part being connected downstream of said coal gasification system and having an exhaust gas turbine; a steam generator system receiving exhaust gas from said exhaust gas turbine and having an economizer heating surface, an evaporator heating surface, and superheater heating surfaces; a steam turbine part being connected to said steam generator system and having a high-pressure feedwater system; and means for connecting said heat exchanger device of said coal gasification system to said high-pressure feedwater system of said steam turbine part for directly transferring thermal energy for feedwater heating, wherein said connecting means connects said outlet of said heat exchanger device to said economizer heating surface of said steam generator system.

2. Combined gas and steam turbine plant according to claim 1, including a gas scrubber connected downstream of said heat exchanger device.

3. Combined gas and steam turbine plant according to claim 1, including means for eliminating superheating of steam for steam production from high-pressure feedwater.

4. Combined gas and steam turbine plant according to claim 1, including means for reducing superheating of steam for steam production from high-pressure feedwater.

* * * * *